Figure 1:
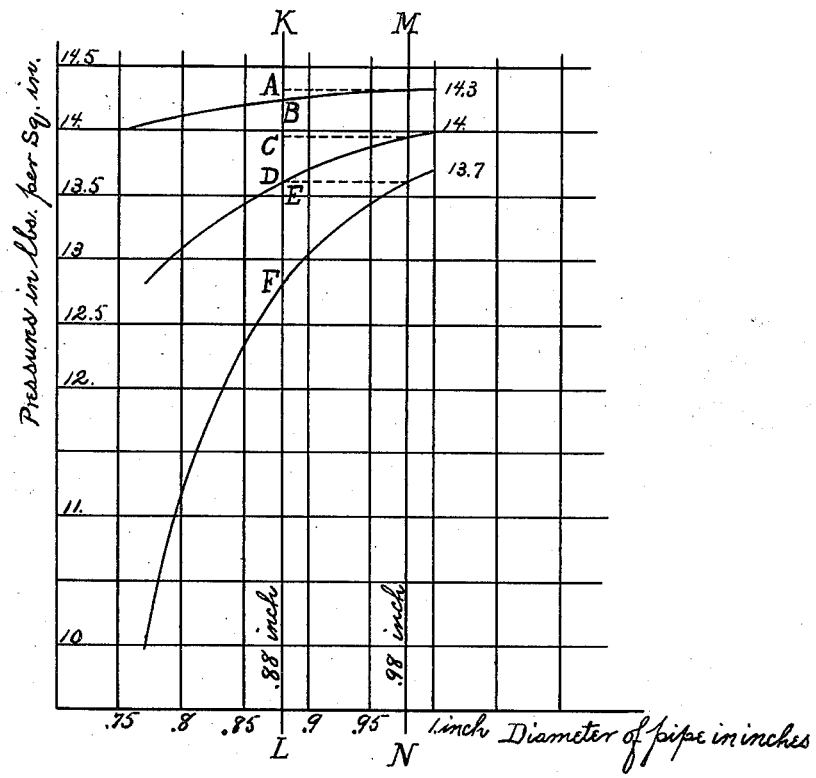

E. T. JOHNSON, W. H. GLASER & H. R. LLOYD.
CARBURETER.
APPLICATION FILED MAR. 30, 1912.

1,074,625.

Patented Oct. 7, 1913.

3 SHEETS—SHEET 1.

Witnesses
J. M. Fowler Jr.
Charles N. Murray.

Inventors
E. T. Johnson
W. H. Glaser
H. R. Lloyd
By Eugene C. Brown
Atty.

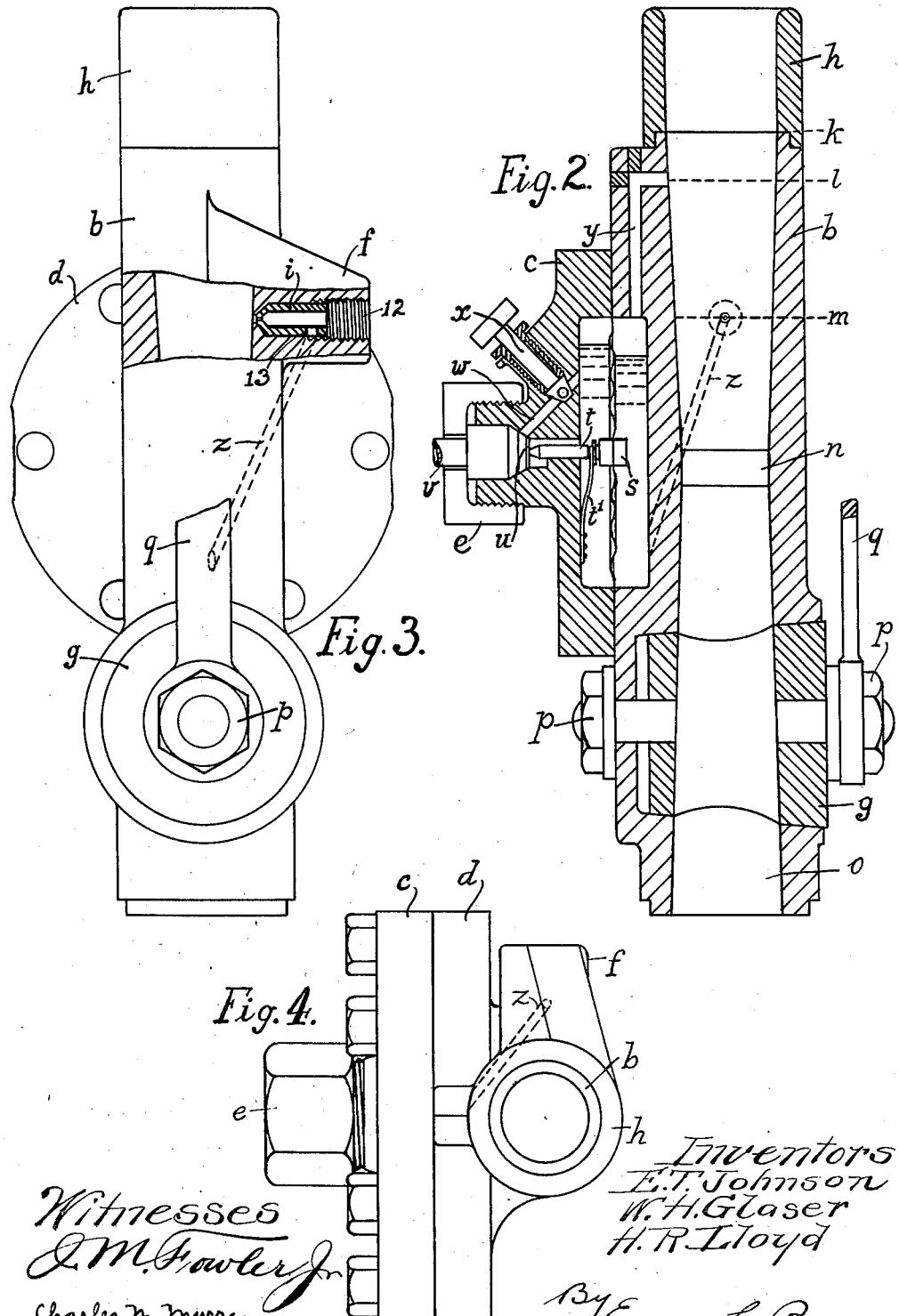

UNITED STATES PATENT OFFICE.

ERIC TOWNSEND JOHNSON, OF TIMPERLEY, AND WILLIAM HENRY GLASER AND HAROLD RHYS LLOYD, OF CHEADLE HULME, ENGLAND.

CARBURETER.

1,074,625.   Specification of Letters Patent.   Patented Oct. 7, 1913.

Application filed March 30, 1912. Serial No. 687,298.

*To all whom it may concern:*

Be it known that we, ERIC TOWNSEND JOHNSON, a resident of Timperley, and WILLIAM HENRY GLASER and HAROLD RHYS LLOYD, residents of Cheadle Hulme, in the county of Chester, England, all subjects of the King of Great Britain, have invented new and useful Improvements in Carbureting Apparatus, of which the following is a specification.

This invention relates to carbureters, principally for use with internal combustion engines such as are employed for instance on automobiles.

The principal object of the invention is to provide a carbureter which will give automatically a constant or approximately constant mixture of air and spirit throughout a wide range of speeds of flow of the air, i. e. throughout a wide range of working speeds of the engine. It may be desirable to have a relatively rich mixture, i. e. one containing an excessive amount of spirit in proportion to the air at low speeds, while at higher speeds the mixture is of normal strength and is practically constant in strength. Such a result is readily obtainable in accordance with this invention in a carbureter which operates automatically without the use of any valves or like moving parts except such as are needed to maintain an approximately constant amount of fuel in the feed chamber. This object is attained by the use of a contracting pipe of a kind sometimes called a "Venturi" pipe, through which the charges are drawn in by the engine, and in which the mixing or carbureting takes place. The suggestion has been made already to use such a Venturi pipe in a carbureter with a spirit inlet at the narrowest section communicating with a float feed chamber, the spirit being forced out by the varying pressure of the air on the surface of the spirit in the said chamber; this pressure was to be produced by having the float chamber closed except for a passage at its upper end communicating with apertures in the Venturi pipe at or near its largest section. It was then supposed that the pressure difference between the air pressure apertures and the spirit inlet aperture would be proportional to the square of the quantity or speed of the air flowing through the pipe for any positions of the apertures, and that the amount of spirit forced through the jet would be proportional to the square root of the pressure head, so that the feed of spirit would be directly proportional to the amount of air flowing through the pipe. A Venturi pipe was to be used having its sectional area at the narrowest part about one eighth of the sectional area at the place where the air pressure openings are made. The above is mentioned in order to distinguish clearly from it the differences in theory and construction on which the present invention is based. The said carbureter would have operated correctly only if air were an incompressible fluid, i. e. one which did not expand or contract with pressure changes, and if the air could be assumed to be at rest at the inlet of the pipe. These assumptions cannot be made, and in order to design a satisfactory carbureter using a Venturi pipe as above, it is necessary to take into account the expansion of the air under reduction of pressure, and the drop in pressure of the air at the inlet of the pipe. It is also essential to insure substantially stream-line flow of the air through the pipe so that the rate of flow and the pressures may vary as required, and for this purpose a pipe must be used whose contraction of sectional area from the inlet is such that the narrowest sectional area is not less than about 60 per cent. of the inlet area, while the pipe contracts gradually and approximately uniformly from the inlet to the neck.

In designing the carbureter use is made of the following formula which correctly represents the relation betwen the area and pressure in a gas flowing through a pipe of gradually varying sectional area, neglecting only slight errors such as that due to friction, which is very small in a short pipe such as is used according to the present invention. The formula is:—

$$\frac{1}{a_2^2} = \frac{1}{a_1^2}\left(\frac{p_2}{p_1}\right)^{\frac{2}{\gamma}} + \frac{2\gamma}{\gamma-1} \cdot \frac{g}{V_1 W^2}\left(\frac{p_2}{p_1}\right)^{\frac{2}{\gamma}}\left\{p_1 - p_2\left(\frac{p_2}{p_1}\right)^{-\frac{1}{\gamma}}\right\}$$

The derivation of this formula is given in our British Patent No. 8926 of 1911. In this formula:—$a_1$ and $p_1$ are the area and pressure respectively of the air at the inlet opening of the pipe, and $a_2$ and $p_2$ are the area and pressure at another point in the pipe. $g$ is the acceleration due to gravity, as usual. $\gamma$ is the ratio for air of the specific heat at constant pressure to the specific heat at constant volume. W represents the rate of flow of the air in units of mass per unit of time. $V_1$ represents the volume of unit mass of air at the pressure $p_1$. The method of using this formula and its application to the design of a particular carbureter will now be described with reference to the accompanying drawings, wherein:—

Figure 7:
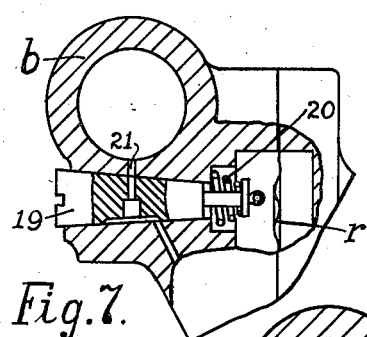
Figure 6:
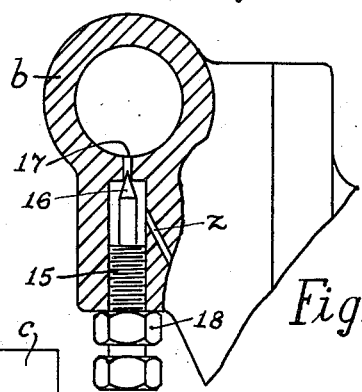
Figure 5:
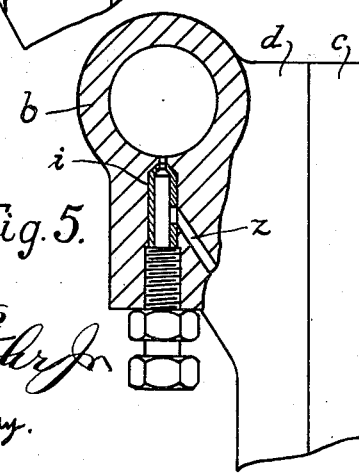
Figure 9:
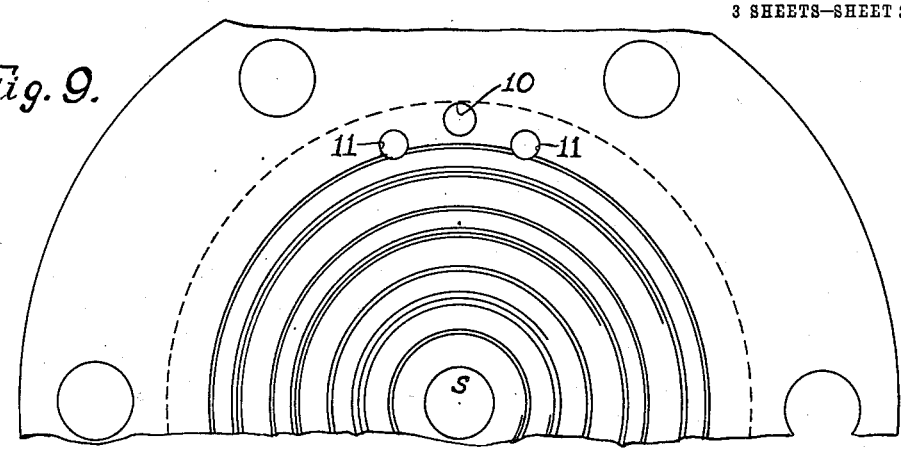
Figure 8:
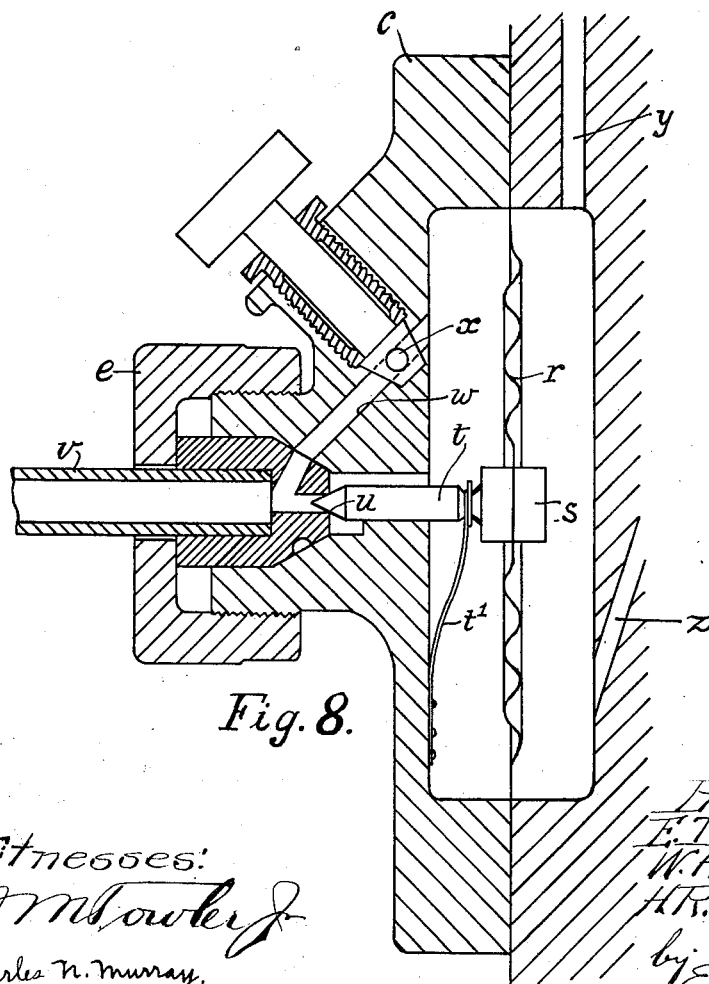

Figure 1 is a diagram showing curves obtained from the above formula. Fig. 2 is a section of a carbureter according to the invention, having its pipe vertical. Fig. 3 is a view partly in section, of the same carbureter seen from the side. Fig. 4 is a plan view thereof. Figs. 5, 6 and 7 are detail views showing sections of three different forms of horizontally arranged carbureters. Fig. 8 is an enlarged sectional view of a supply chamber for the spirit or liquid fuel, and Fig. 9 is a partial face view of a diaphragm used in said chamber.

The procedure in designing a carbureter according to the invention is as follows: The quantity W is estimated for the maximum speed of flow, that is to say, the speed of flow when working with an engine at maximum speed and with the throttle valve fully open. From this an area $a_1$ is chosen for the pipe large enough to insure stream line flow of the air. A pressure $p_1$ is assumed (less than atmospheric pressure) and also a pressure $p_2$ not less than 70 per cent. of $p_1$ in order that stream line flow may be insured. The assumed pressure $p_1$ may be estimated by experiment or calculation, but it is not necessary to determine it very accurately as the error due to choosing $p_1$ slightly too large or too small is inappreciable. The value of $a_2$ for the throat or neck of the pipe is next determined from the formula above, and also various intermediate values of $p_2$ for intermediate values of $a_2$. After this the calculations are repeated taking W for two thirds the maximum load and again for one third the maximum load, assuming in each case suitable values for $p_1$ which will be nearer to atmospheric pressure the lower the velocity, and the corresponding value of W. The results so obtained are plotted on a diagram as in Fig. 1, in which vertical distances represent pressures in pounds per square inch, and horizontal distances represent diameters of the contracting pipe. The curves then show the relation between the diameters of the pipe at various sections thereof, and the pressures at those sections for each of the three selected speeds of flow of the air, which correspond approximately to the maximum speed (when the engine is running at top speed) the normal speed, and the lowest ordinary working speed respectively. The lowest curve in Fig. 1 corresponds with the maximum speed and the highest curve corresponds with the lowest speed. The initial pressures $p_1$ have been assumed as being 13.7, 14 and 14.3 pounds per square inch for the maximum, normal and lowest speeds respectively, as the result of experiments, and the pipe has been chosen with a largest diameter of one inch. Having drawn these curves a pair of straight edges, designated by the lines K L and M N, are moved about in a vertical position over the curves until a position is found for the lines in which a certain relation holds good; that is to say, when horizontal lines are drawn from the points where the line M N cuts the three curves, the distances, A B, C D, and E F from those horizontal lines to the corresponding points where the line K L cuts the curves, are to be approximately in the ratio of 1:4:9. These ratios represent pressure differences between pairs of points in the pipe at the diameters where K L and M N cut the base line, and these are the desired pressure ratios because they are proportional to the square of the differences in speeds of flow of the air through the pipe. If these pressure differences are used in injecting the spirit at the point of narrower section (corresponding with the position of M N) the amount of spirit injected will be proportional to the air flowing, because the amount of spirit which will flow through the orifice is proportional to the square root of the pressure under which it is forced to flow. The actual ratios of A B: C D: E F are nearly 1.15: 4: 9.2 in the diagram; this is a desirable departure from the exact proportions stated above because it will result in a richer mixture being made at low speeds (as is desired for starting purposes for instance) and a slightly richer mixture at very high speeds when maximum power is to be developed. The strength of the mixture is nearly constant for a wide range of intermediate speeds. The points where K L and M N cut the base line correspond with diameters of the pipe of 0.88 and 0.98 of an inch respectively. The smallest diameter at the throat of the pipe may be about 0.78 of an inch without disturbing the stream-line flow, if the angle of taper is small. The diameter of the orifice through which the spirit is fed into the pipe is estimated from known data to be 1.375 millimeters to obtain the correct carbureted mixture at the normal speed of flow of the air, assuming that the specific gravity of the spirit is about 0.73. Of course different curves of the same type would be obtained for a carbureter to work with a different average flow of air, but the method of working would be the same.

In the drawings, a carbureter is illustrated, designed as above explained.

Referring to Figs. 2, 3 and 4, *b* is the carbureter pipe of varying section, and *c* is a cup-shaped member bolted on to a projecting flange *d* on the side of the pipe *b*. *e* is the cap of a valve casing forming part of the member *c*. *f* is a projection cast on the pipe *b* to receive the member in which the fuel inlet orifice is formed, and *g* is a throttle valve which is fitted into the pipe *b* in the lower part thereof and is preferably formed to the same taper, as shown. *h* is a short cylinder or ferrule which may be fitted on the top of the carbureter pipe *b*, and which may be cylindrical in bore, the object of this ferrule being to secure stream-line flow in the air before it gets into the pipe *b* itself. The pipe *b* is one inch in diameter at the top where the line *k* is marked in Fig. 2. It is .98 of an inch in diameter at the dotted line *l*, .88 of an inch in diameter at the dotted line *m*, and .78 of an inch in diameter at the middle portion marked *n* which may be cylindrical. From this point onward down the pipe the section increases again until it may be 1 inch at the bottom end *o*. The pipe need not necessarily be truly conical in the parts of varying section but it is shown so for convenience. Any suitable form of throttle may be used, but the plug valve *g* is indicated as a convenient form of valve, a conical seating being turned out within the lower part of the pipe *b*, and the plug *g* of conical form which fits in the seating being bored with the tapering passage shown. The plug valve is held in place by a stud and nut *p*, and is adapted to be turned by means of a handle *q* (which is partially indicated) for the purpose of partly closing the passage in the pipe *b* and so reducing the flow of air therethrough. The irregularity in the flow caused by the plug *g* in the lower part of the pipe will not appreciably disturb the stream-line flow in the upper part above the throat *n* so that the feed of the liquid fuel can take place approximately under the conditions explained above. A diaphragm *r* is clamped between the flanges of the parts *c* and *d*, (see Figs. 8 and 9) the said diaphragm being circumferentially corrugated so that the diaphragm will move laterally owing to differences of pressure at the two sides thereof. At the center of the diaphragm a boss *s* is secured, this boss being formed for instance as a nut and a bolt screwing together to clamp the diaphragm between them. On one side of the boss *s* is arranged a rod *t* with a tapered point acting as a needle valve in a seating *u*. This rod *t* is arranged so as to follow the movement of the boss *s*. It may be attached to the said boss in such a manner as not to interfere with the free movement of the diaphragm but it is preferably mounted so as to be pressed by a spring against a tapering point on the boss *s*. In the arrangement illustrated in the drawings a small collar is formed on the end of the rod *t* adjacent to the boss *s* and a groove is formed in front of this collar. In this groove engages the forked end of a strip spring *t'* which is mounted on the member *c* and presses against the collar on the rod *t* so as to cause this rod to follow the movement of the diaphragm *s* away from the seating *u*. The pipe conveying the liquid fuel to the carbureter is shown at *v* opening into the valve seating *u*. From the seating *u* a branch passage *w* leads into the chamber in the member *c*, and there is a suitable cock *x* in the branch passage, this cock being normally set to close the passage and being opened only for instance when it is required to fill the carbureter chamber in starting working therewith or after emptying the same. At the top of the diaphagm *r* holes are formed to allow the air pressure to be equalized at both sides of the diaphragm and also to allow for the flow of the liquid fuel at a certain level. In Fig. 9 two holes 11 are shown for the flow of the liquid, and another hole 10 at a higher level which will insure the equalization of the air pressures. A duct *y* (referred to hereinbefore as the air pressure duct) formed in the projecting side portion of the carbureter pipe leads from the top of the diaphragm chamber at the right-hand side thereof as seen in Fig. 2 up to an orifice in the carbureter pipe *b* at the line *l* where the diameter in the pipe is .98 of an inch. Another passage *z* leads from a point near the bottom of the diaphragm chamber at the right-hand side thereof as seen in dotted lines in Fig. 2 up to the interior of the projection *f*, in which is a ferrule *i* fitted in a bore in the projection *f*, and held against a seating at the inner end thereof by means of a screw plug 12. The ferrule *i* has a central orifice, which is on the line *m* as seen in Fig. 2, and a hole at 13 communicating with the passage *z* so that the liquid fuel forced out from the diaphragm chamber *r* through the passage *z* can reach the interior of the ferrule *i*, and can enter the pipe *b* from the small orifice at the inner end of the said ferrule.

The working of this carbureter will now be evident with very little further explanation. Assuming the diaphragm chamber to be empty at both sides of the diaphragm the plug valve *x* will be turned to admit a little liquid fuel into the chamber at the left-hand side of the diaphragm (Fig. 2) and then as the chamber fills the diaphragm *r* will become pressed back causing the needle valve *t* to admit liquid through the seating *u*. The plug valve *x* may now be closed. The liquid will fill the inlet side of the diaphragm and will overflow through the holes 11 to the other side; it will then fill up the right-hand side to approximately the level indicated in Fig. 2, and the parts are so adjusted that the needle valve *t* then closes on its seating preventing the admission of any further liquid until the level at the right-hand side falls again, thus upsetting the balance of pressure and causing the needle valve *t* to open. The level of the liquid at the right-hand or outlet side of the diaphragm will not in practice vary greatly because directly the level begins to sink the valve will open and more liquid will be admitted which will overflow to the outlet side of the diaphragm. The device then serves to maintain the liquid at an approximately constant level in the chamber communicating with the fuel inlet orifice in the member *i*. This orifice is a little way above the level of the liquid so that there is no risk that the liquid will flood the passage leading to the orifice, and escape. When the engine is drawing in a charge however there will be the differences of air pressure produced between the opening of the air pressure duct *y* and the fuel orifice in the member *i*, and the increased pressure on the surface of the liquid in the diaphragm chamber will cause the liquid to be ejected through the passage *z* and ferrule *i* into the carbureter pipe *b*, the amount of liquid injected varying with the amount of air flowing through the pipe in the manner already explained. The little difference in pressure due to the fact that the orifice of the ferrule *i* is above the level of the liquid in the diaphragm chamber will make no appreciable difference to the amount of the liquid fuel injected through the said orifice. The variations in the air pressure in the diaphragm chamber at different speeds of flow of the air through the carbureter pipe will be communicated equally to both sides of the diaphragm *r* so that they will have no effect on the said diaphragm, and will not cause the valve *t* to open and close. The opening of the said valve will depend therefore solely upon the falling of the level of the liquid at the outlet side of the diaphragm. The throttle valve *g* will be used in the well known way to reduce the supply of carbureted air when the engine is running fast, and when the full power is not required, and then of course the amount of air passing through the pipe will be reduced, but the carbureter will always work under normal circumstances within the ranges of speed of air for which it was designed.

The construction of the carbureter can of course be varied considerably but the arrangement shown in Figs. 2, 3 and 4 indicates the experimental form of the carbureter. The carbureter pipe *b* need not necessarily be vertical although that will be the most convenient position of the pipe for many types of engines. The pipe *b* may be horizontal if preferred or in any other position, and of course its section will be the same for working with the same engine, no matter what its position. In a vertical pipe the parts may be suitably transposed to allow the air to flow in an upward instead of a downward direction.

Fig. 5 shows a section through a horizontal carbureter pipe *b* taken on the line *m* where the fuel inlet orifice is. The parts *c* and *d* including the diaphragm chamber and inlet valve may be the same as in the construction already described; the ferrule *i* in which is formed the fuel inlet orifice is shown as being arranged vertically and opening into the carbureter pipe at the lower end of the vertical diameter thereof. This view will require no further explanation and it will be obvious that the carbureter will work in this case in precisely the same manner as the carbureter shown in Figs. 2, 3, and 4. The air pressure duct is not indicated in Fig. 5 but of course it communicates with the carbureter pipe at a point of larger section and leads into the diaphragm chamber above the level of the liquid just as in Fig. 2.

Fig. 6 shows a type of fuel inlet orifice as applied to a horizontal carbureter pipe, this orifice having a screw plug 15 formed with a conical head 16 adjustable in the said orifice 17 in the pipe *b*. The object of this construction is to enable the fuel inlet orifice to be adjusted when required. A lock nut 18 secures the plug 15 in the position in which it is set.

In Fig. 7 a tapered plug valve 19 is shown forming an adjustable fuel inlet valve. The tapered plug 19 is held in place by a spring 20 at the inner end thereof which lies in a recess in the diaphragm chamber. The plug has a transverse passage and it can be turned for instance by a screw driver to adjust this passage so as to register wholly or partially with the orifice 21 leading into the carbureter pipe *b*. In this way the size of the orifice can be adjusted. Of course it is not intended that the adjustable valve should be altered in its setting during normal working but it would be altered if the feed of fuel was found to be too low or too high, and then the automatic variations in the fuel supply with different amounts of air flowing through the carbureter pipe would insure the correct proportionality between the fuel and air at the different speeds of the engine.

Various modifications in the apparatus can be made without departing from the scope of the invention. For instance the diaphragm feed device may be replaced by any known equivalent device for maintaining the spirit at a constant level in the feed chamber. Further, any other arrangement might be used in place of the by-pass cock *x* for filling the said chamber with spirit at starting. The spirit inlet orifice may come nearer to or even it may be at the throat $n$ of the pipe when designed for certain amounts of air and ranges of speeds as hereinbefore explained. It is preferable however, to have a throat in the pipe beyond the spirit inlet orifice as shown, so that there will be a reduction of pressure with consequent further expansion in passing through the throat $n$, which will assist in the vaporization of the spirit. The throat also protects the carbureter against the effects of resurgence due to sudden pressure changes in the pipe leading to the engine. The direction of flow of the air through the carbureter pipe might be reversed, as the pressure differences would still be practically the same for the same speeds of flow. The pipe need not vary uniformly in section, but any desired form of pipe of varying section may be used, provided that there is no sudden change of section such as would be likely to produce eddies in the air.

The invention is evidently applicable for mixing any readily vaporizable liquid with a gas, and the word "air" may be read throughout as covering also other gases than air, while "spirit" or "liquid fuel" covers any readily vaporizable liquid to be mixed with the gas. Similarly the word "carbureter" may be read as including a mixing apparatus of the type described, for a gas and a vaporizable liquid, used for any suitable purpose.

We claim as our invention:—

1. In a carbureting apparatus, the combination of a pipe of gradually varying section with two openings therein at points of different section, the said sections being of areas such that the fluid pressure differences between said openings caused by the flow of air through the pipe at varying speeds and the corresponding varying pressures at the two openings are substantially proportional to the square of the quantity of air flowing at the various speeds, connecting passages between said openings and means for supplying spirit to one of the passages under a gaseous pressure head determined by the other passage.

2. In a carbureting apparatus, the combination of a pipe of gradually varying section with two openings therein at points of different section, the said sections being of areas such that the fluid pressure differences between said openings caused by the flow of air through the pipe at varying speeds, and the corresponding varying pressures at the two openings are substantially proportional to the square of the quantity of air flowing at the various speeds, a chamber and means of supplying spirit thereto, a passage leading from the opening at the larger section of the pipe to the upper part of said chamber, and another passage leading from below the level of the spirit in said chamber to the opening in the pipe at the smaller section thereof.

3. In a carbureting apparatus, the combination of a pipe of gradually varying section formed with an intermediate throat whose free sectional area is more than sixty per cent. of the sectional area at the inlet of the pipe, said pipe having two apertures, one at a point of larger section and the other at a point of smaller section, connecting passages between said apertures, and means for supplying spirit to one of said passages under a gaseous pressure head determined by the other passage.

4. In a carbureting apparatus, the combination of a pipe of gradually varying section contracting from the inlet end to a throat whose free sectional area is more than sixty per cent. of the sectional area at the inlet, said pipe being formed with two apertures at points of different sectional area, both at the side of the throat at which the inlet lies, connecting passages between said apertures, and means for supplying spirit to one of said passages under a gaseous pressure head determined by the other passage.

In witness whereof, we have hereunto signed our names this 22nd day of March 1912, in the presence of two subscribing witnesses.

ERIC TOWNSEND JOHNSON.
WILLIAM HENRY GLASER.
HAROLD RHYS LLOYD.

Witnesses to all the signatures:
ERNOLD SIMPSON MOSELEY,
MALCOLM SMETHURST.